(12) United States Patent
Park (10) Patent No.: US 6,393,195 B1
(45) Date of Patent: May 21, 2002

(54) METHOD FOR PREVENTING ABRASION OF VIDEO HEADS IN TAPE RECORDER

(75) Inventor: Jae Wan Park, Kyunggido (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/210,988

(22) Filed: Dec. 15, 1998

(30) Foreign Application Priority Data

Jun. 11, 1998 (KR) .............................................. 98-22836

(51) Int. Cl.[7] .................................................. H04N 5/76
(52) U.S. Cl. .......................................... 386/46; 386/67
(58) Field of Search .............................. 386/46, 67, 68, 386/69; 360/72.1, 74.3; 242/356.5

(56) References Cited

U.S. PATENT DOCUMENTS 5,788,175 A * 8/1998 Hwang .................... 242/356.5

FOREIGN PATENT DOCUMENTS

JP 403116570 A * 5/1991

* cited by examiner

*Primary Examiner*—Huy Nguyen
(74) *Attorney, Agent, or Firm*—Birch, Stewart, Kolasch & Birch, LLP (57) ABSTRACT

A method is disclosed for a recording/reproducing apparatus during a non-recording period in which a recording medium is in a loaded position and a head drum of the recording/reproducing apparatus is rotating. The recording/reproduction apparatus includes a video head, a supply-reel, a take-up reel, and an idler arm movable between the supply-reel and the take-up reel. In the method, friction between the recording medium and the video head and/or the head drum is eliminated during the non-recording period by drawing out the recording medium away from the video head.

16 Claims, 6 Drawing Sheets

METHOD FOR PREVENTING ABRASION OF VIDEO HEADS IN TAPE RECORDER

BACKGROUND OF THE INVENTION

Field of the Invention

The present invention relates generally to a method for preventing abrasion of video heads in a video tape recorder. More specifically, the present invention relates to a method for eliminating friction between video heads and a recording medium in a time-lapse video tape recorder by loosening the tension of the recording medium when the head drum keeps rotating and the recording medium is maintained in its loaded state during an intermittent recording pause period.

BRIEF DESCRIPTION OF THE RELATED ART

Unlike an ordinary continuous video tape recorder which records every frame of video signals, a time-lapse video tape recorder intermittently records video signals from several video cameras on a magnetic tape at a pre-selected regular time interval. During the recording, the magnetic tape is moved and stopped, repeatedly. The time-lapse video tape recorder is often used in various areas requiring long-time recording, such as, a security monitoring system in banks and museums.

Figure 1:
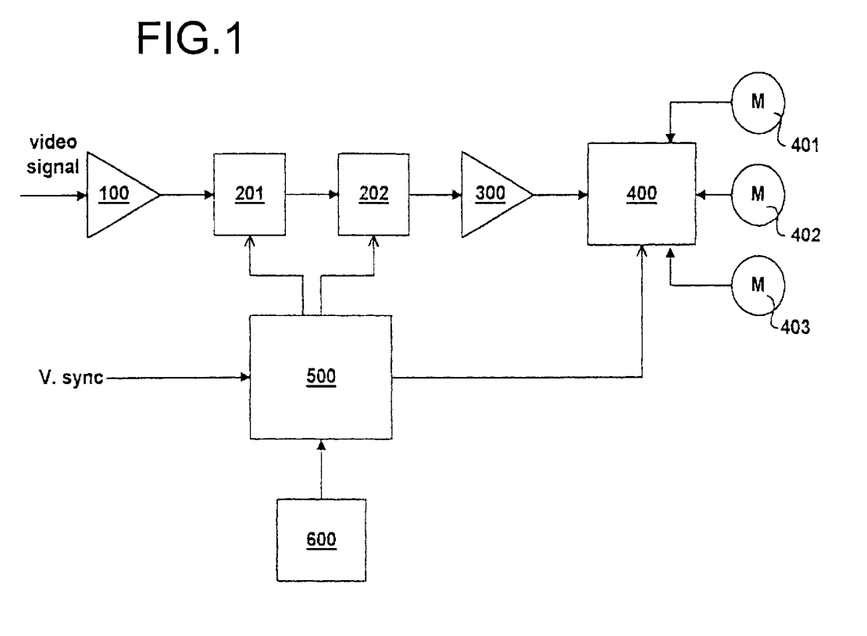
FIG. 1 is a general block diagram of a time-lapse video tape recorder equipped with a memory.

FIG. 1 shows a block diagram of a general time-lapse video tape recorder. As shown in therein, a time-lapse video tape recorder generally includes an AID converter 100 which converts an analog video signal from an external video camera into a digital data stream, a buffer memory 201 in which the digital video data are stored temporarily, a field memory 202 in which the digital video data from the buffer memory 201 are stored before they are recorded on a magnetic tape, a D/A converter 300 which converts the digital video data in the field memory 202 into an analog video signal, a recording unit 400 which records the analog video signal on the magnetic tape, and a controller 500 which controls writing/reading intervals of video signal received from the external video cameras to/from the memories 201 and 202 according to a user input from an input unit 600.

The time-lapse video tape recorder further comprises a loading motor 401, a drum motor 402, and a capstan motor 403, and the recording unit 400 comprises a signal processing unit which processes the video signal for recording, and mechanical elements, shown in FIGS. 2 to 5.

The loading motor 401 moves a loading post 1 to load/unload a magnetic tape TP. The drum motor 402 rotates a head drum 3 on which a video head 2 is mounted to record/reproduce the video signal on the magnetic tape TP. The capstan motor 403 rotates a capstan shaft 4 to move the tape TP at a designated tape running speed. An idler gear 6 transmits the rotating force of the capstan motor 403 to either a supply reel 7 or a take-up reel 8 to wind the tape TP loosened due to the forward or reverse movement of the tape TP.

In the time-lapse video tape recorders configured as above, the tape TP is maintained in the loading state and the head drum 3 is rotating in a recording pause period. Depending on the length of the recording pause period, the tape TP can be unloaded or the rotation of the head drum 3 can be suspended temporarily during the recording pause period. The method for unloading the tape TP or stopping rotation of the head drum 3 is described below in more detail.

The video signal received from an external video camera is converted into a stream of digital video frames by the A/D converter 100 and then stored in the field memory 202 via the buffer memory 201. The video frames in the buffer memory 202, which are received in real time, are selected intermittently at the predetermined time interval between frames, and the selected frames are stored in the field memory 202.

When the number of the video frames stored in the field memory 202 becomes equal to 150 frames (the storage capacity of the field memory 202), the stored video frames are read out and, in turn, converted into analog video signals. These analog video signals are recorded on the tape TP in the recording unit 400 while the tape TI moves in the forward direction.

The video signal output from the external video camera is continually stored in the buffer memory 201 during the recording of the stored video frames on the tape TP. When the recording of the 150 frames stored in the field memory 202 is completed, new 150 frames stored in the buffer memory 201 are transferred to the empty field memory 202 at the frame extraction ratio corresponding to a selection interval of video frames. The recording unit 400 is maintained in an idle state until the field memory 202 becomes full again. This way, the recording unit 400 alternates between the recording mode and the recording pause mode.

Figure 2:
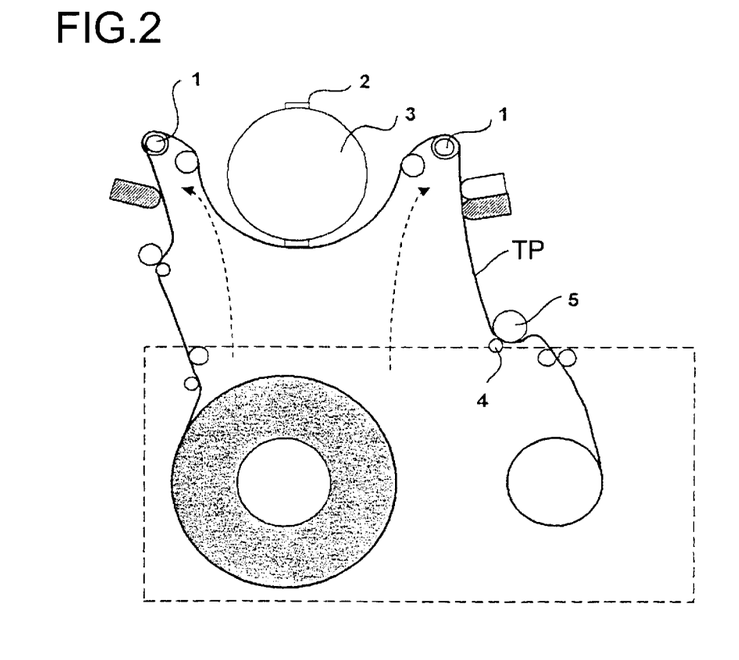
FIG. 2 is a diagrammatic view of a loading state of a recording unit of the time-lapse video tape recorder shown in FIG. 1.
Figure 3:
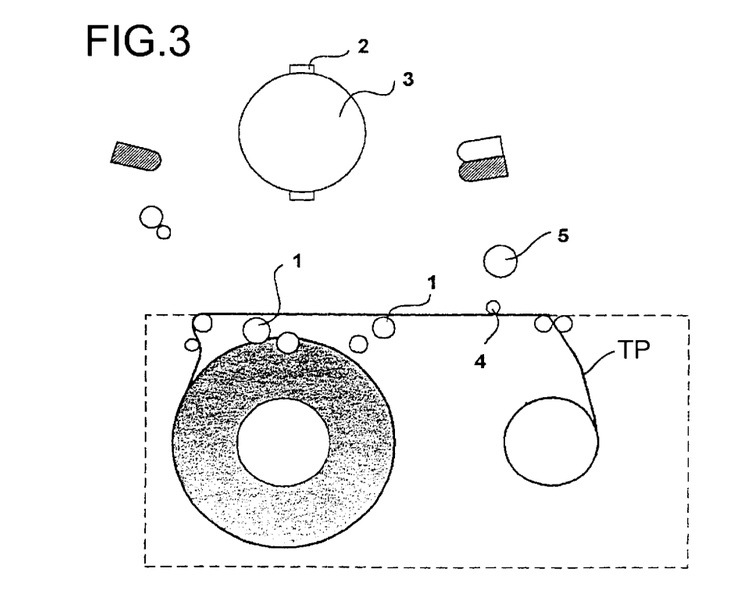
FIG. 3 is a diagrammatic view of an unloading state of the recording unit of the time-lapse video tape recorder shown in FIG. 1.

When a user inputs a total recording time desired, a recording pause period is calculated by the controller 500 in consideration of the storage capacity of the field (e.g., 3 minutes), the recording unit 400 operates in an alternating mode. In the alternative mode, the tape TP is unloaded and the rotation of the head drum 3 is stopped during a pause period of the alternative mode, as shown in FIG. 3, and then the tape TP is loaded again and the rotation of the head drum 3 is resumed during a recording period of the alternative mode, as shown in FIG. 2. Otherwise, the recording unit 400 operates in a mode where the tape TP is loaded and the head drum 3 rotates all the time regardless of the recording or non-recording period.

In the above-described recording/reproduction methods, however, there exist periods in which the tape TP is maintained in its loading state and the head drum 3 rotates even though no recording occurs during these periods. During such periods, video heads constantly contact the tape TP. For example, in the alternating mode, when the recording pause period is shorter than 3 minutes, the video heads contact the tape TP. As a result, the video heads are easily worn out due to the friction between the tape TP and the rotating head drum 3 and/or heads 2. Consequently, the video signal is recorded on the tape TP in low quality, and the lifespan of the magnetic tape TP is considerably shortened.

SUMMARY OF THE INVENTION

Accordingly, an object of the present invention is to solve the above mentioned problems and other disadvantages of the conventional methods.

Another object of the present invention is to provide a method for eliminating friction between a video head and a recording tape in a time-lapse video tape recorder by loosening the tension of the recording tape while still in the loaded state during a recording/reproduction pause period.

Briefly described, the present invention is directed to a method for a recording/reproducing apparatus during a non-recording period in which a recording medium is in a loaded position and a head drum of the recording/reproducing apparatus is rotating, wherein the recording/reproduction apparatus further includes a video head, a supply-reel, a take-up reel, and an idler arm movable between the supply-reel and the take-up reel, the method comprising the step of eliminating friction between the recording medium and at least one of the video head and the head drum.

Furthermore, a method for preventing abrasion of video heads of a recording/reproducing apparatus, according to the present invention includes the steps of determining whether or not recording in the recording/reproducing apparatus has paused in an intermittent recording mode; and loosening tension of a loaded recording medium based on the determination result.

Moreover, a method for a recording/reproducing apparatus having a memory for storing video data therein, a video head for recording and reproducing data on and from a recording medium, and a head drum, according to the present invention includes the steps of reproducing video signals recorded on the recording medium; storing the reproducing video signals in the memory; determining whether the memory is fill; and eliminating friction between the recording medium and at least one of the video head and the head drum based on a result from the determining step.

The present invention takes the effect of preventing abrasion of the video heads and the recording medium (e.g., magnetic tape) in case where the recording medium is maintained in its loading state and the head drum keeps rotating in an intermittent recording mode.

The above objectives, features, and advantages of the present invention will become apparent from the following detailed description of illustrative embodiments thereof to read in conjunction with the accompanying drawings.

BRIEF DESCRIPTION OF THE DRAWINGS

The accompanying drawings, which are included to provide a further understanding of the invention, illustrate a preferred embodiment of this invention, and together with the description, serve to explain the principles of the present invention.

In the drawings.

DETAILED DESCRIPTION OF THE PREFERRED EMBODIMENTS

Figure 4:
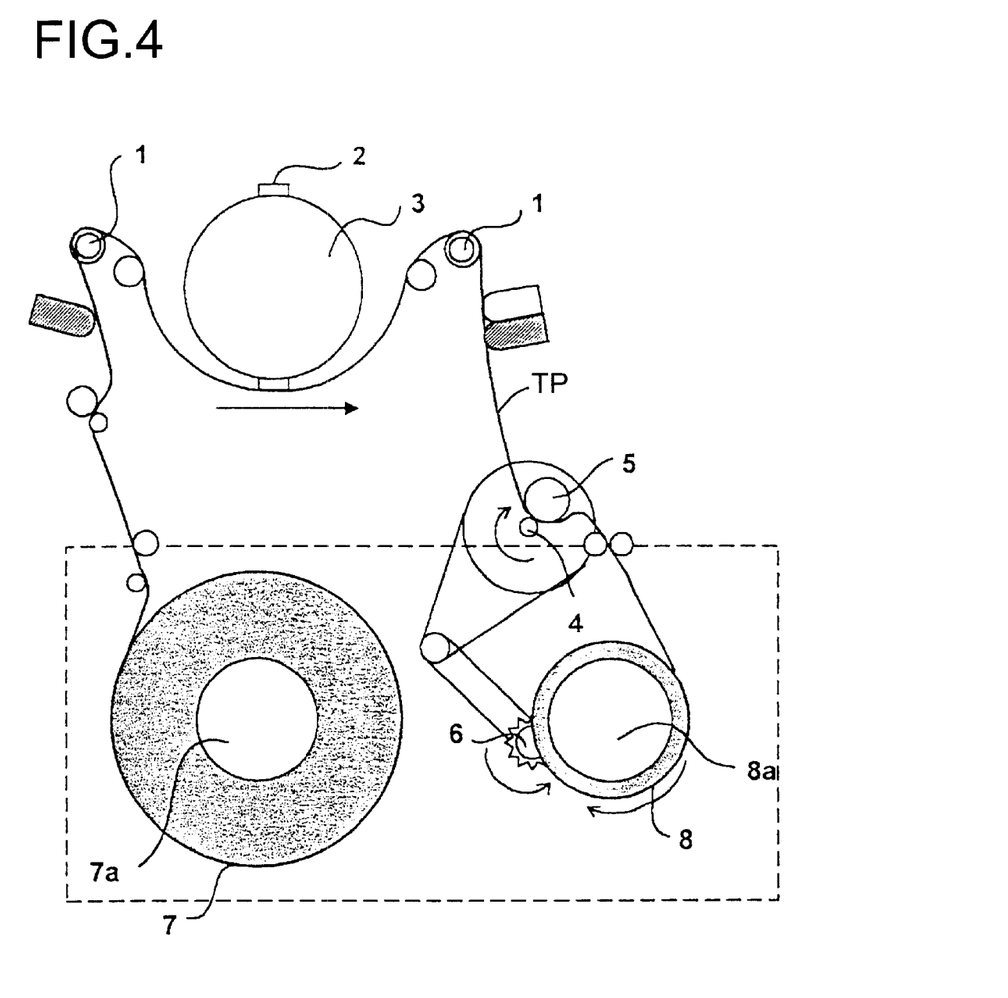
FIG. 4 is a diagrammatic view showing operations of a time-lapse video tape recorder in recording mode according to the present invention.

The methods for preventing friction between video heads and a recording medium during a non-recording mode of a time-lapse video tape recorder according to a preferred embodiment of the present invention are described below in detail with reference to schematic diagrams shown in FIGS. 1, 4, and 5 and flow charts of FIGS. 6 and 7. The recording medium can be a magnetic tape or other mediums known in the art for recording video data therein, and the time-lapse video tape recorder of the present invention can be the recorder shown in FIG. 1 modified as needed to implement the methods of the present invention.

When a total recording time is input by a user via the input unit 600 of the time-lapse video tape recorder of the present invention, the controller 500 calculates a recording pause period. If the calculated recording pause period is shorter than a predetermined recording interval (e.g., 3 minutes), the magnetic tape TP (or the like) is maintained at its loaded position in the deck while the head drum 3 continues to rotate during this recording pause period.

The video signal from an external video camera is written intermittently into the field memory 202 frame by frame. Once the field memory 202 becomes full, the controller 500 reads out the stored video frames sequentially and controls the recording unit 400 to begin recording of the video frames on the tape TP while moving the tape TP in the forward direction at a normal speed (S10).

At this time, the driving force of the capstan motor 403 is transmitted to the take-up reel 8 by an idler gear 6. When the idler gear 6 contacts the take-up reel 8, the take-up reel 8 starts to rotate in the same rotational direction as the capstan shaft 4. This causes the tape TP to wound around the take-up reel 8, and an appropriate tension for the tape TP is maintained.

The recording mode is maintained until retrieving of the video frames from the field memory 202 is completed. Upon completion of recording all the retrieved video frames (S20), the recording mode is changed into a recording pause mode in which the recording operation is stopped and the field memory 202 stores the next intermittent video frames (S30). At the same time, the controller 500 rotates the capstan shaft 4 in the reverse direction (e.g., in the counterclockwise direction) by a predetermined period of time so that the tape TP is drawn out by a predetermined distance (S40), as shown in FIG. 5.

The predetermined period of time for drawing out the tape TP is set such that it is not longer than the time it takes for the idler gear 6, which was contacting the take-up reel 8, to move toward the supply reel 7 and to come in contact with the supply reel 7. The reason why the capstan shaft 4 rotates in the reverse direction by the predetermined period of time is as follows. Once the rotation direction of the capstan shaft 4 changes into the reverse direction (i.e., counterclockwise direction in FIG. 5) to draw out the tape TP to loosen the tension, the idler gear 6 which engaged the capstan shaft 4 moves from the take-up reel side to the supply reel side, and starts to rotate the supply reel 7 as soon as it contacts the supply reel 7 so that the tape TP can be rewound on the supply reel 7. Therefore, after the tape TP has been drawn out for a set period of time, the tension of the tape TP is restored and the head drum 3 keeps rotating to record the next frame data.

Figure 5:
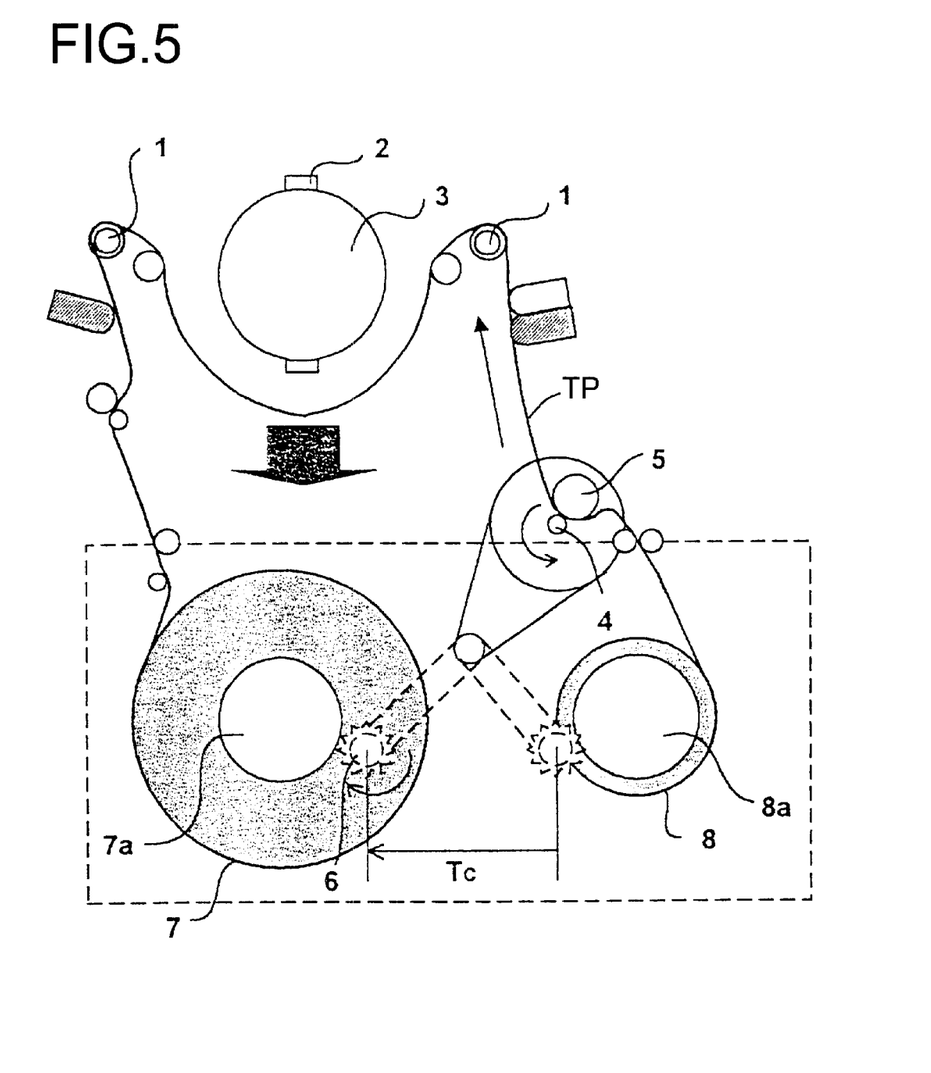
FIG. 5 is a diagrammatic view showing operations of a time-lapse video tape recorder in non-recording mode according to the present invention.
Figure 6:
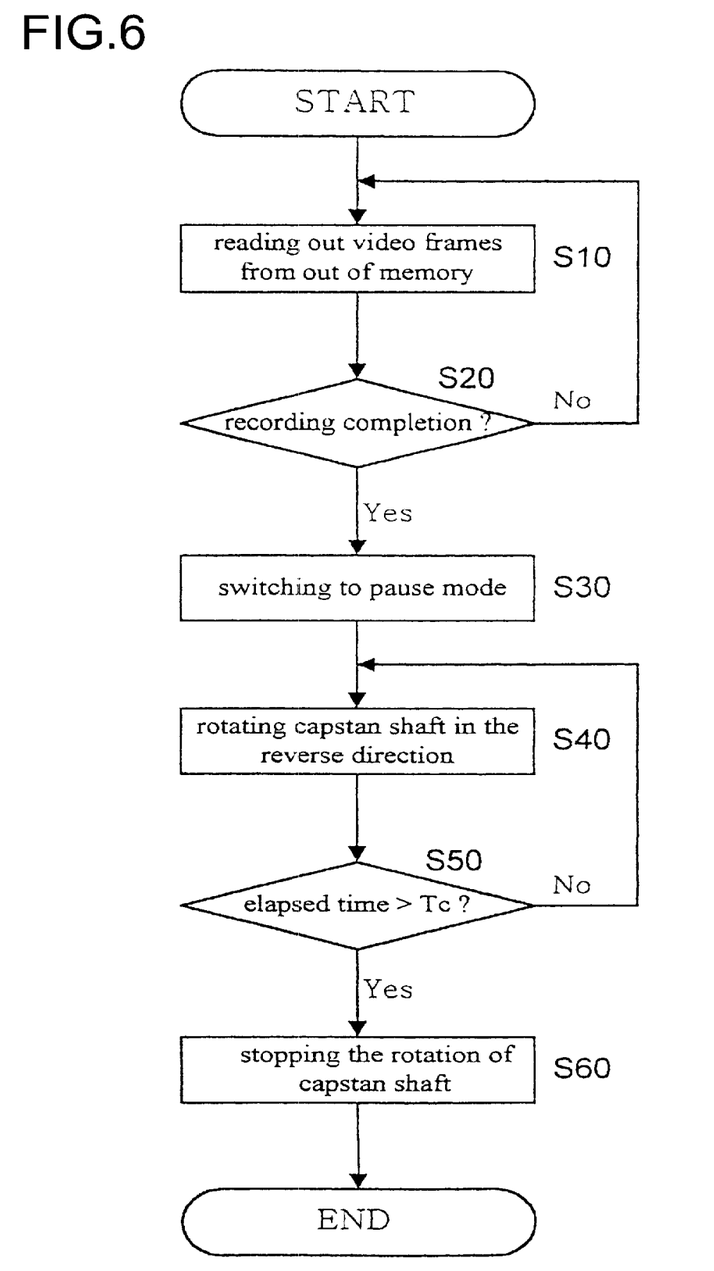
FIG. 6 is a flow chart illustrating a method for eliminating friction between a video head and a recording medium according to an embodiment of the present invention.

In order to reduce the tension on the tape TP, while the controller 500 rotates the capstan shaft 4 reversely, the controller 500 determines whether or not the time elapsed since the reverse rotation of the capstan shaft 4 has started is equal to the predetermined period of time Tc shown in FIG. 5 (S50). Here, the predetermined period of time Tc is the time little less than the time it takes for the idler gear 6 to move from the supply reel 7 side to the take-up reel 8 side, or from the take-up 8 reel side to the supply reel 7 side. When the elapsed time becomes equal to Tc (i.e., before the idler gear 6 contacts the supply reel 7), the reverse rotation of the capstan shaft 4 is immediately suspended, thereby stopping the rotation of the idler gear 6 (S60). As a result, the driving force of capstan motor 403 is not transmitted to the supply reel 7 because the idler gear 6 does not contact the supply reel 7, and the amount of tape TP loosened during the predetermined period of time is not wound on the supply reel 7. Because of the length of the tape TP so loosened, the tape TP does not contact the head drum 3 and/or the video heads 2. Accordingly, abrasion on the video heads 2, tape TP, or the drum 3 is prevented even during the recording pause period in which the head drum 3 keeps rotating and the tape TP is maintained in its loading state.

Figure 7:
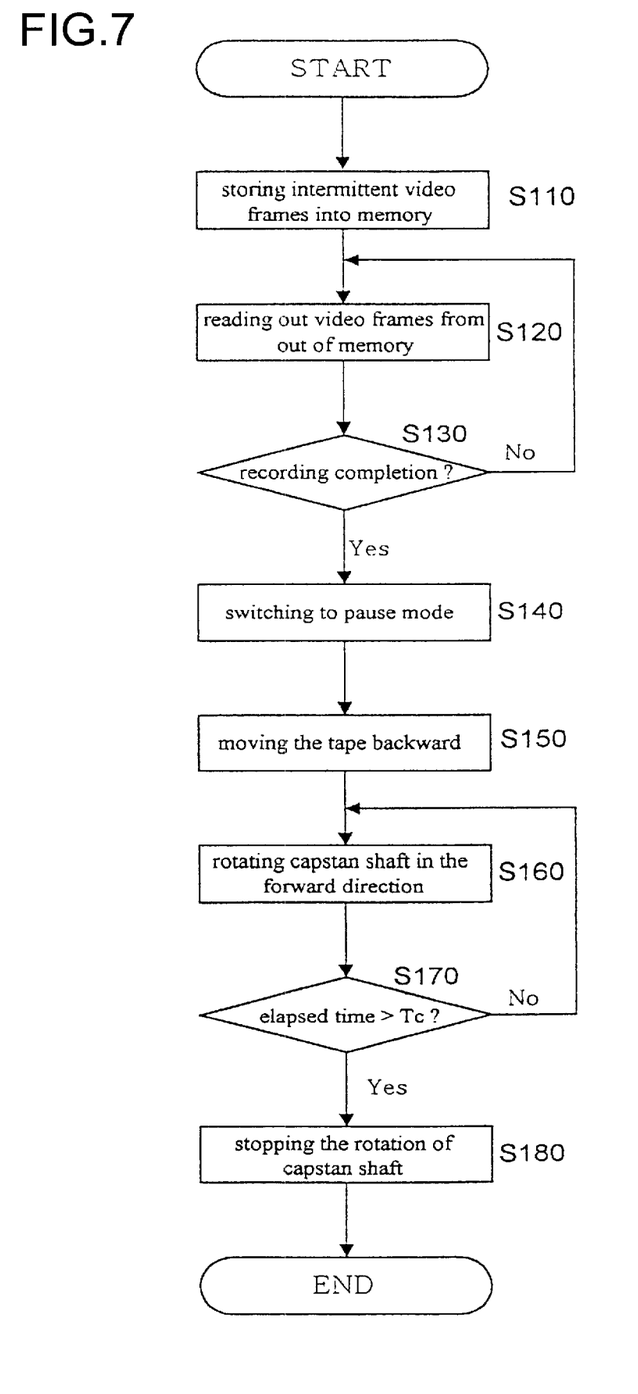
FIG. 7 is a flow chart illustrating a method for eliminating friction between a video head and a recording medium according to another embodiment of the present invention.

FIG. 7 shows another embodiment of the present invention to prevent wear of the video heads of a time-lapse video tape recorder. This embodiment is applied to an intermittent recording method where a recording medium (e.g., magnetic tape TP) is moved in a reverse direction by a predetermined distance during a recording pause period for a subsequent recording of intermittent video frames.

According to this embodiment of the present invention, the video signal received from the external video camera is stored intermittently into the field memory 202 frame by frame (S110). Upon completion of storing the video frames in the field memory 202, the video frames are read out sequentially, and at the same time, they are recorded on the tape TP which runs in the forward direction at a normal speed (S120). Then, it is checked whether or not the recording is completed by the controller 500 (S130). The moment the recording is completed, the recording mode is changed to a recording pause mode (S140) and the tape TP is moved in the reverse direction by a predetermined distance (S150).

Here, the reverse movement of the tape TP is provided since it requires time for the paused tape TP to accelerate and reach the normal running speed for the next recording period. The predetermined distance reversibly moved by the tape TP compensates for this time required to accelerate and reach the normal running speed. This allows the tape TP to move in the forward direction at the normal running speed exactly from the position where the last recording has stopped on the tape TP. The reverse movement of the tape TP is also required for searching the accurate position where the last frame recorded on the tape TP using codes stored in the frame data.

In order to loosen the tape TP after the above-described reverse movement of the tape TP, the controller 500 moves the tape TP in the forward direction after the reverse movement of the tape TP has been completed. That is, the controller 500 rotates the capstan shaft 4 in the forward direction (e.g., clockwise direction in FIG. 5) (S160). At this time, the rotational direction of the capstan shaft 4 is opposite to that of the embodiment of FIG. 6. Afterwards, it is checked whether or not the time elapsed since the forward movement of the capstan shaft 4 is equal to the predetermined of time Tc (S170). If it is, the rotation of the capstan shaft 4 is stopped (S180). As discussed above, the predetermined period of time Tc is chosen such that it is not longer than the time it takes for the idler gear 6, which has been contacting the supply reel 7 up to this point, to come in contact with the take-up reel 8.

In another example, instead of using the predetermined period of time Tc to control the movement of the capstan shaft 4, it is possible to continuously detect the position of the idler gear 6 on the swing path between the supply reel 7 and the take-up reel 8 and stop the rotation of the capstan shaft 4 just before the idler gear 6 comes in contact with one of the two reels based on the detected position of the idler gear 6.

Although the foregoing embodiments of present invention which were described in the above are applied to a memory-based time-lapsed video tape recorders, the present invention also can be applied to a conventional time-lapse video tape recorders, which has no memory for buffering intermittent video frames, where a video signal is recorded intermittently on the tape frame by frame while a tape repeats advancing a frame and pausing. If a tape is maintained in the loaded state and the head drum keeps rotating in the intervals between recording operations, the abrasion of the video heads can be prevented by loosening the tension of the tape according to the above-explained methods of the present invention.

The foregoing is provided only for the purpose of illustration and explanation of the preferred embodiment of the present invention, so changes, variations and modifications may be made without departing from the spirit and scope of the invention.

What is claimed is:

1. A method for eliminating friction between a recording medium and at least one of a video head and a head drum of a recording/reproducing apparatus during a non-recording period in which the recording medium is in a loaded position and the head drum of the recording/reproducing apparatus is rotating, the recording/reproducing apparatus further including a supply-reel, a take-up reel, and an idler arm movable between the supply-reel and the take-up reel, the method comprising the step of:

drawing out the recording medium away from the at least one of the video head and the head drum to eliminate friction between the recording medium and the at least one of the video head and the head drum,
wherein said drawing out step includes moving the recording medium in a reverse direction for a predetermined time period, wherein the predetermined time period is less than a time required for the idler arm contacting the take-up, reel to move and contact the supply-reel.

2. A method for eliminating friction between a recording medium and at least one of a video head and a head drum of a recording/reproducing apparatus during a non-recording period in which the recording medium is in a loaded position and the head drum of the recording/reproducing apparatus is rotating, the recording/reproducing apparatus further including a supply-reel, a take-up reel, and an idler arm movable between the supply-reel and the take-up reel, the method comprising the step of:

drawing out the recording medium away from the at least one of the video head and the head drum to -eliminate friction between the recording medium and the at least one of the video head and the head drum,
wherein said drawing out step includes moving the recording medium in a forward direction for a predetermined time period, wherein the predetermined time period is less than a time required for the idler arm contacting the supply reel to move and contact the take-up reel.

3. A method according to claim 1, further comprising:
detecting the beginning of the non-recording period to perform said drawing out step.

4. A method according to claim 1, wherein in said drawing out step, the recording medium is a recording tape.

5. A method according to claim 4, wherein the recording tape is a magnetic tape.

6. A method for preventing abrasion of video heads of a recording/reproducing apparatus, wherein the recording/reproducing apparatus includes a supply reel, a take-up reel, and an idler arm movable between the supply and take-up reels, the method comprising the steps of:

determining whether or not recording in the recording/reproducing apparatus has paused in an intermittent recording mode; and loosening tension of a loaded recording medium based on a result of said determining step, wherein said loosening step includes moving the recording medium in a reverse direction for a predetermined time period, wherein the predetermined time period is less than a time required for the idler arm contacting the take-up reel to move and contact the supply reel.

7. A method for preventing abrasion of video heads of a recording/reproducing apparatus, wherein the recording/reproducing apparatus includes a supply reel, a take-up reel, and an idler arm movable between the supply and take-up reels, the method comprising the steps of:

determining whether or not recording in the recording/reproducing apparatus has paused in an intermittent recording mode; and loosening tension of a loaded recording medium based on a result of said determining step, wherein said loosening step includes moving the recording medium in a forward direction for a predetermined time period, wherein the predetermined time period is less than a time required for the idler arm contacting the supply reel to move and contact the take-up reel.

8. A method according to claim 6, wherein in said loosening step, the recording medium is a magnetic tape.

9. A method for a recording/reproducing apparatus having a memory for storing video data therein, a video head for recording and reproducing data on and from a recording medium, and a head drum, the method comprising the steps of:

reproducing video signals recorded on the recording medium;

storing the reproduced video signals in the memory;

determining whether the memory is full; and eliminating friction between the recording medium and at least one of the video head and the head drum based on a result from said determining step.

10. A method according to claim 9, wherein said eliminating step includes: loosening tension of the recording medium.

11. A method according to claim 9, wherein said eliminating step includes:

drawing out the recording medium away from the at least one of the video head and the head drum.

12. A method according to claim 11, wherein said drawing out step includes: moving the recording medium in a reverse direction for a predetermined time period.

13. A method according to claim 12, wherein the recording/reproducing apparatus includes a take-up reel, a supply reel, and an idler arm movable between the take-up and supply reels, and in said moving step, the predetermined time period is less than a time required for the idler arm contacting the take-up reel to move and contact the supply reel.

14. A method according to claim 11, wherein said drawing out step includes: moving the recording medium in a forward direction for a predetermined time period.

15. A method according to claim 14, wherein the recording/reproducing apparatus includes a take-up reel, a supply reel, and an idler arm movable between the take-up and supply reels, and in said moving step, the predetermined time period is less than a time required for the idler arm contacting the supply reel to move and contact the take-up reel.

16. A method according to claim 9, wherein in said reproducing step, the recording medium is a magnetic tape.

* * * * *